United States Patent
Kurtz

(10) Patent No.: US 7,255,841 B2
(45) Date of Patent: Aug. 14, 2007

(54) SODIUM BICARBONATE PRODUCTION METHOD

(75) Inventor: Andrew D. Kurtz, Belle Mead, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 234 days.

(21) Appl. No.: 10/674,227

(22) Filed: Sep. 29, 2003

(65) Prior Publication Data

US 2004/0057892 A1  Mar. 25, 2004

Related U.S. Application Data

(63) Continuation-in-part of application No. 09/910,540, filed on Jul. 20, 2001, now abandoned.

(51) Int. Cl.
*C01D 7/00* (2006.01)
*C01D 7/10* (2006.01)

(52) U.S. Cl. .............. 423/206.1; 423/206.2; 423/209; 423/421; 423/427

(58) Field of Classification Search .......... 423/206.1, 423/206.2, 209, 421, 422, 426, 427
See application file for complete search history.

(56) References Cited

U.S. PATENT DOCUMENTS

| | | | |
|---|---|---|---|
| 4,869,882 A | 9/1989 | Dome et al. | |
| 5,262,134 A | 11/1993 | Frint et al. | |
| 5,283,054 A | 2/1994 | Copenhafer et al. | |
| 5,609,838 A | 3/1997 | Neuman et al. | |
| 5,618,504 A | 4/1997 | Delling et al. | |
| 5,624,647 A | 4/1997 | Zolotoochin et al. | |
| 5,766,270 A | 6/1998 | Neuman et al. | |
| 5,955,043 A | 9/1999 | Neuman et al. | |
| 6,322,767 B1 | 11/2001 | Neuman et al. | |
| 6,428,759 B1 | 8/2002 | Smith et al. | |
| 6,589,497 B2 | 7/2003 | Smith | |
| 2002/0192140 A1* | 12/2002 | Smith | 423/421 |

* cited by examiner

*Primary Examiner*—Timothy C. Vanoy
(74) *Attorney, Agent, or Firm*—Phillip R. Kiefer; Frenkel & Associates

(57) ABSTRACT

A method of producing sodium bicarbonate having a high degree of purity and obtaining a net reduction in effluent waste water, as compared to prior processes, when starting from trona ore is disclosed. The process entails utilizing the waste-water effluent stream from the conversion of trona ore to sodium carbonate as the feed for the conversion of sodium carbonate to sodium bicarbonate.

1 Claim, 2 Drawing Sheets

SODIUM BICARBONATE PRODUCTION METHOD

CROSS-REFERENCE TO RELATED APPLICATIONS

This application is a continuation-in-part of U.S. patent application Ser. No. 09/910,540, filed Jul. 20, 2001 now abandoned, and the benefit of which is here claimed.

STATEMENT REGARDING FEDERALLY SPONSORED RESEARCH OR DEVELOPMENT

Not Applicable

FIELD OF THE INVENTION

The invention relates to processes for the production of sodium bicarbonate, sodium carbonate, and sodium carbonate decahydrate, all as may be derived from trona. It also relates to obtaining additional desired product from a given weight of ore. It further relates to reduction of waste water from commercial production facilities.

BACKGROUND OF THE INVENTION

The commercial production of sodium bicarbonate generally begins with the mining of trona ore, which is processed in "soda" plants to produce sodium carbonate. The desired product of that production is a high quality and fairly pure sodium carbonate product. In normal sodium bicarbonate production the pure sodium carbonate product is then converted to sodium bicarbonate in a separate plant. The conversion of the carbonate to bicarbonate is typically done in a "no waste-water effluent" manner.

The actual mining of trona ore may be accomplished by either dry mining or solution mining. Following dry mining, the trona ore is conventionally processed according to either the sesquicarbonate process or the monocarbonate process. The sesquicarbonate process involves a series of steps, including: dissolving crude mined trona in a cycling, hot mother liquor containing excess normal sodium carbonate over sodium bicarbonate in order to dissolve the trona congruently, clarifying the insoluble muds from the solution, filtering the solution, passing the filtrate to a series of vacuum crystallizers where water is evaporated and the solution is cooled causing sodium sesquicarbonate to crystallize out of the solution in a stable crystal phase, recycling the mother liquor to dissolve more crude trona and calcining the sesquicarbonate crystals at a temperature sufficient to convert same to sodium carbonate, or soda ash.

A more direct and simplified method developed subsequently to the sesquicarbonate process is the monohydrate process. The monohydrate process tends to yield a dense, organic-free sodium carbonate product through a series of steps which include: calcining the crude trona ore at a temperature of about 125 degrees C. to about 500 C. to convert the trona ore to crude sodium carbonate and to reduce the amount of the organics by oxidation and distillation, dissolving the crude sodium carbonate in water, clarifying the resulting sodium carbonate solution to remove insoluables as muds therfrom, filtering the clarified solution, evaporating water from the clarified and filtered sodium carbonate solution in an evaporator circuit, crystallizing sodium monohydrate crystals from the pregnant mother liquor, calcining the monohydrate crystals to produce a dense, organic-free sodium carbonate product and recycling the mother liquor from the crystals to the evaporation step. The dense soda ash product produced by the monohydrate process has become has become the standard product of the trona based sodium carbonate/soda ash industry.

Still another trona processing technology involves solution mining. Solution mining has become of more interest as costs associated with dry mining have increased. Futhermore, solution mining offers a process by which the large quantities of ore remaining as pillars, walls, and ceilings in previously dry mined areas may be recovered. In its simplest form, solution mining involves dissolving trona ore into a solution and recovering sodium products from the solution. For example, a trona ore deposit, or other sodium-containing ore, is contacted with a solvent, such as water. The water dissolves the trona ore creating a brine. The brine is recovered and processed to recover sodium carbonate, sodium bicarbonate, sodium sesquicarbonate, sodium monohydrate, or other sodium products. The sodium depleted brine is typically recycled to the trona ore deposit to dissolve additional trona.

Over the years, commercial waste-water production has been severely curtailed by governmental action. First, water use demand needs to be kept low in commercial processes (where possible) so as to allow for adequate supplies for personal use and for commercial use that cannot be further reduced. Second, effluent water must be treated before being released into the environment so as to have as little an impact on the environment as possible. Unfortunately, waste-water treatment facilities are limited by both the volume of waste-water they can handle and the contaminants which might be in the waste-water. For these reasons, there has been severe governmental pressures to keep the volume of waste-water from commercial facilities to as low an amount as possible. In this vein, the amount of waste-water which can be discharged by a commercial plant is heavily regulated and subject to governmental permits.

Therefore, processes that allow for a reduction of effluent waste-water over current commercial production processes are highly sought after.

In addition, as non-renewable natural resources, such as mined ore, are used, there becomes an ever increasing need to extract more and more desired product from the production line using the same amount of starting ore. It would be highly desired to recover any significant amount of additional product without having to mine additional ore.

To achieve both additional production of desired product and simultaneously reduce effluent waste-water is a truly prized situation that is desired in any commercial process. Achieving these typically requires a trade-off in reduced product purity; to achieve these with improved product purity would obviously be the best possible result.

OBJECTS OF THE INVENTION

It is therefore an object of the invention to provide a process for the production of sodium bicarbonate (beginning with mined trona ore) that produces less effluent waste-water than current processes.

It is also an object of the invention to provide a process for the production of sodium bicarbonate that allows for greater recovery of sodium as carbonate and/or bicarbonate per unit weight of trona ore than previously used processes.

It is yet another object of the invention to obtain an end product which, despite utilizing a less pure feed than prior processes, is of the same or even greater purity than the product resulting from the prior processes.

Other objects of the invention will be apparent to those of ordinary skill in the art.

BRIEF SUMMARY OF THE INVENTION

These and other objects of the invention can be achieved by utilizing the waste-water effluent stream of a sodium carbonate manufacturing facility (hereinafter stream A) as a feed for sodium carbonate decahydrate production. The sodium carbonate decahydrate product (crystal, typically containing 63% water and 37% sodium carbonate) is then used as the feed for a sodium bicarbonate production process. While there is an ultimate effluent from the sodium carbonate decahydrate production (waste-water stream C) and from the sodium bicarbonate production (waste-water stream B) steps, the total amount of stream B plus stream C is less than the stream A utilized for the sodium carbonate decahydrate production feed. Thus there is a net reduction in waste-water effluent, and an improvement in recovered sodium value, over the prior processes. A further surprising result is that the purity of the resulting sodium bicarbonate is as good as or even better than from the prior process, even though the sodium carbonate feeding the plant is not as pure as the soda ash used formerly.

DETAILED DESCRIPTION OF THE INVENTION

Figure 1:
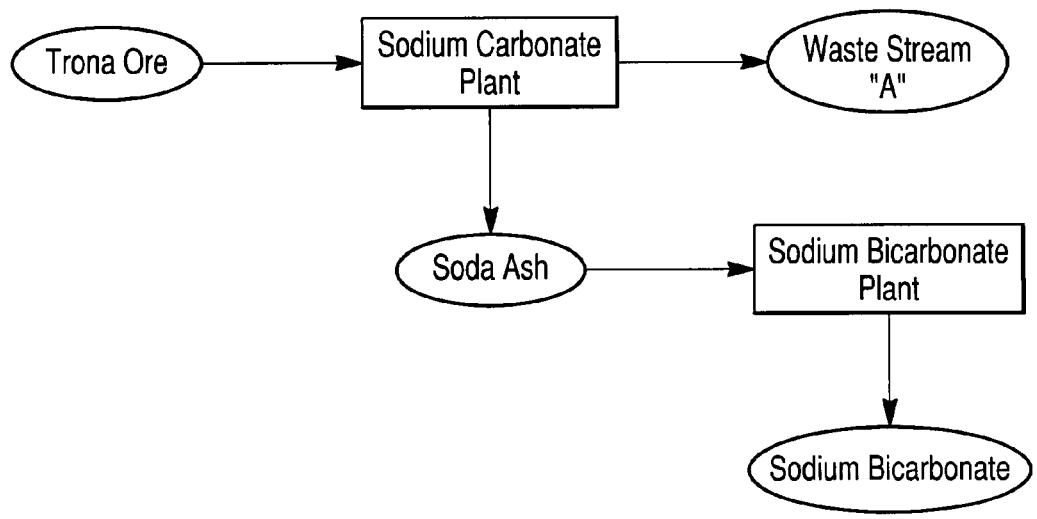
FIG. 1 is a block diagram of the prior art process of making sodium bicarbonate from trona ore through an anhydrous sodium carbonate (soda ash) intermediate.

The present invention is the achievement of a number of goals, all of which may be achieved separately or simultaneously. In essence, the invention is the use of a waste-water effluent stream (A) from a monohydrate production process as a feed for a process which converts sodium carbonate ultimately into sodium bicarbonate. This waste-water stream (A) which the present invention utilizes for its raw material input typically contains significant amounts of unrecovered sodium value generally from about 2% to about 5% of the total amount of sodium carbonate contained in the mined trona, and typically the waste water stream A itself will contain about 20 to 30 weight % sodium carbonate. The otherwise recovered sodium carbonate can be used as sodium carbonate for the usual purposes, but it is applicant's novel process for the utilization of the sodium carbonate contained in waste water stream which is the subject of this invention.

The sodium carbonate manufacturing facility from which waste-water stream A leads will generally be a monohydrate facility such as is described in the BACKGROUND above. Because of regulatory factors to keep waste-water effluent streams as low as possible, the usual conversion of purified sodium carbonate to sodium bicarbonate has been practiced by methods that have a zero waste-water effluent stream. The use of the effluent stream (A), because it contains water, necessarily means that there will be a waste-water effluent stream in any process which utilizes it as a feed source. However, the total amount of waste-water effluent stream produced in the conversion of the sodium carbonate contained in the effluent stream (A) is surprisingly less than the amount of effluent stream (A) consumed as a feed source.

In addition, the effluent stream (A) contains a large number of contaminants that would be expected to carry over in some part into the sodium bicarbonate product. A typical waste water stream from a monohydrate production facility utilizing trona ore as the source of sodium carbonate yields the analysis set forth in TABLE 1:

TABLE 1

| | |
|---|---|
| $Na_2CO_3$% | 30 |
| COD ppm | 2350 |
| $Cl^-$ ppm | 1200 |
| $SO_4^-$ | 2500 |
| $Ca^{++}$ ppm | 118 |
| $Mg^{++}$ ppm | 18 |
| Soluble Si ppm | 1500 |
| Total Si ppm | 2200 |
| Al ppm | 79 |
| As ppm | 2.5 |
| B ppm | 62 |
| Ba ppm | 16 |
| Fe ppm | 5 |
| K ppm | 1390 |
| Mo ppm | 11 |
| P ppm | 164 |
| V ppm | 5 |

Since sodium bicarbonate is frequently used in food and pharmaceutical products and in very sensitive electronic component cleaning products, etc., high purity is an absolute necessity for commercially produced sodium bicarbonate. Therefore, introduction of any contaminants in excess of that present in current commercially produced materials is not suitable. Surprisingly, despite the presence of substantially greater contamination by a host of contaminants in the stream (A) not significantly present in the pure or substantially pure sodium carbonate used as the typical feed for a sodium carbonate to sodium bicarbonate conversion process, the product resulting from the inventive process using the stream (A) as a feed for a sodium carbonate to sodium bicarbonate conversion process is at least as pure, and generally purer than the sodium bicarbonate produced by the current non-effluent waste-water sodium carbonate to sodium bicarbonate production process.

As the first step in the process, any conversion of trona ore to sodium carbonate process can be used as long as it produces a waste-water effluent stream which has unrecovered sodium carbonate dissolved therein. The typical trona ore to sodium carbonate processes are known in the art as seen from: "Sodium Carbonate," Kirk Othmer Encyclopedia of Chemical Technology, $4^{th}$ Ed., Vol. 1, 1991.

The effluent waste-water stream (A) resulting from the conversion of trona ore to sodium carbonate (which contains additional sodium carbonate dissolved therein) is used as a liquid feed into a process for the conversion of a portion of the sodium carbonate dissolved therein into sodium carbonate decahydrate. This "decahydrate process" produces crystals of sodium carbonate decahydrate, which are then fed directly to the sodium bicarbonate plant. The sodium carbonate decahydrate process also has some waster-water liquor, typically referred to as bitterns, but the sum of these bitterns and the waste-water from the sodium bicarbonate process (further downstream) will be less than the original stream A consumed.

Figure 2:
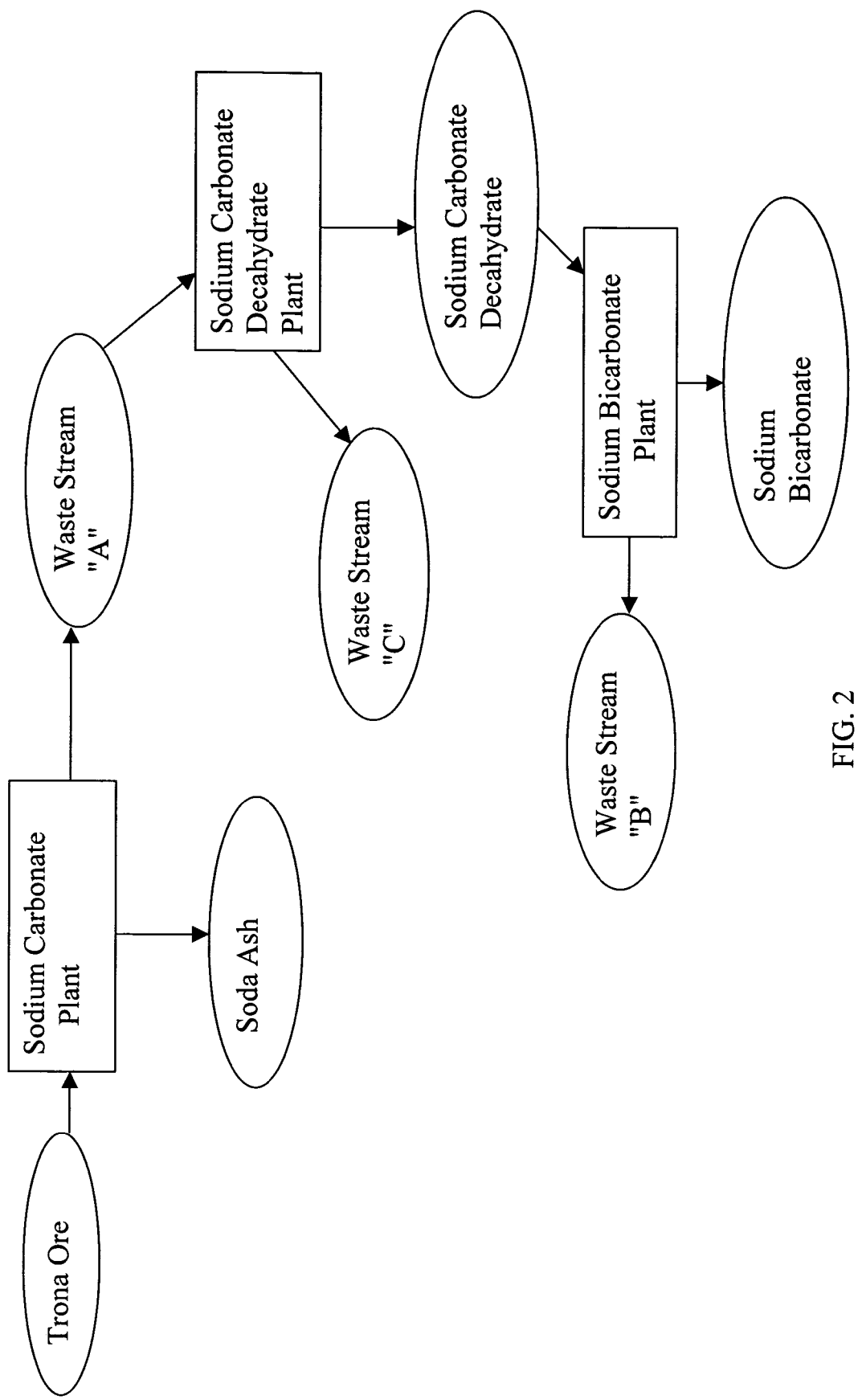
FIG. 2 is a block diagram of the present invention which utilizes the waste stream from the production of soda ash to produce additional sodium bicarbonate and/or sodium carbonate through a sodium carbonate decahydrate intermediate.

The process of the invention is illustrated in FIG. 2, where the entire process 1 is composed of three substeps, linked together as shown. Trona ore is fed into sodium carbonate process 2 which produces sodium carbonate crystal product 3 and effluent waste-water stream A. Stream A is fed into sodium carbonate to sodium carbonate decahydrate conversion plant 4 which produces sodium carbonate decahydrate crystals 5 and waste-water stream C. Sodium carbonate decahydrate crystals 5 are fed into sodium carbonate decahydrate to sodium bicarbonate conversion plant 6, with the production of sodium bicarbonate 7 and waste-water stream B. Both streams B and C contain additional still unrecovered sodium value and may be utilized as had been stream A in the past or either or both may be recycled into sodium carbonate to sodium carbonate decahydrate conversion plant 4 (with or without removal of solids as desired and with or without degassing of carbon dioxide, as may be desired).

EXAMPLES

The following examples are intended only to exemplify the invention by way of example and are not intended to limit the scope of the claimed invention.

Example 1

The existing state of the art in the production of sodium bicarbonate from trona ore is set forth, followed by the instant invention. A mono process plant refines trona ore, ultimately producing a purge (waste-water) stream containing 30% dissolved sodium carbonate as well as a product stream of dry, commercial soda ash, some of which is used in a sodium bicarbonate plant to produce sodium bicarbonate. In the sodium bicarbonate plant, there is no purge and the conversion of soda ash to sodium bicarbonate yields virtually 100% recovery. The waste-water purge, however, is disposed of in evaporation ponds, or some may be sold locally for opportunistic uses at a very low price.

Example of the present invention:

To the above situation a decahydrate plant is added. This decahydrate plant receives the purge from the existing mono process soda ash plant as feed. The decahydrate process is essentially nothing more than a crystallizer, recovering much of the dissolved sodium carbonate as the solid decahydrate of sodium carbonate and yielding its own purge, called bitterns. The decahydrate crystals are fed to the existing sodium bicarbonate plant instead of the refined soda ash formerly fed thereto. The sodium bicarbonate plant runs more or less normally, except the added water fed (note that decahydrate is 63% water and 37% sodium carbonate) necessitates a waste-water purge stream from the sodium bicarbonate plant. At first glance, this purging of a sodium bicarbonate plant is unappealing, but in fact the net purging required with this new technology is less than that required in the prior art, as follows:

For each pound of the waste-water stream consumed as feed into the decahydrate process according to the new process, there is generated 0.353 pounds of bitterns from the decahydrate process and 0.455 pounds of waste-water purge from the sodium bicarbonate process. Thus, total purging overall is 0.808 pounds, which is a reduction of about 19%. Furthermore, the amount of sodium value lost through purging is reduced by about ½, because the bitterns purge contains only 19% sodium carbonate and the sodium bicarbonate process purge contains 14% sodium carbonate equivalent. This reduction in sodium value lost through purging is evidenced by the increased soda ash available for sale, which formerly was fed to the SBC plant.

Furthermore, despite the use of a feed stream (Deca from A) which contains more impurities than the refined soda ash of the prior art, the sodium bicarbonate produced contains about half the level of most impurities found in the prior process. A further application of the concept adds the recycling of the sodium bicarbonate purge back to the feed of the decahydrate plant, so that there is only one net purge, the bitterns stream. This bitterns purge would be somewhat larger, but still less than even the improved case described above.

I claim:

1. A method of reducing waste-water effluent stream produced during the conversion of trona ore into sodium bicarbonate consisting essentially of:
    (1) converting said trona ore into sodium carbonate with the concomitant production of a first waste-water effluent stream containing sodium carbonate using a monohydrate process;
    (2) utilizing said first waste-water effluent stream as a feed stream for a process of converting said sodium carbonate into sodium carbonate decahydrate crystals with the concomitant production of a second waste-water effluent stream;
    (3) feeding said sodium carbonate decahydrate crystals directly to a sodium bicarbonate plant to convert said sodium carbonate decahydrate to sodium bicarbonate with the concomitant production of a third waste-water effluent stream, whereby the total amount of effluent waste-water in said second and third waste-water effluent streams is less than the amount of the effluent waste waster in said first waste water effluent stream.

* * * * *